(12) United States Patent
Habibvand et al.

(10) Patent No.: US 9,109,623 B2
(45) Date of Patent: Aug. 18, 2015

(54) INTEGRATED CARTRIDGE DOUBLE-ROW BALL BEARING FOR A NUCLEAR REACTOR CONTROL ROD DRIVE MECHANISM

(71) Applicant: Roller Bearing Company of America, Inc., Oxford, CT (US)

(72) Inventors: Alex Habibvand, Orange, CA (US); Paul Yamada, Alhambra, CA (US)

(73) Assignee: Roller-Bearing Company of America, Inc., Oxford, CT (US)

( * ) Notice: Subject to any disclaimer, the term of this patent is extended or adjusted under 35 U.S.C. 154(b) by 196 days.

(21) Appl. No.: 13/872,320

(22) Filed: Apr. 29, 2013

(65) Prior Publication Data

US 2014/0321786 A1 Oct. 30, 2014

(51) Int. Cl.
| | |
|---|---|
| *F16C 19/20* | (2006.01) |
| *F16C 33/32* | (2006.01) |
| *F16C 33/37* | (2006.01) |
| *F16C 33/62* | (2006.01) |
| *F16C 19/08* | (2006.01) |
| *F16C 25/08* | (2006.01) |
| *G21C 7/14* | (2006.01) |

(52) U.S. Cl.
CPC ............... *F16C 19/08* (2013.01); *F16C 19/20* (2013.01); *F16C 25/08* (2013.01); *G21C 7/14* (2013.01); *F16C 2240/70* (2013.01); *F16C 2240/82* (2013.01)

(58) Field of Classification Search
CPC ...... F16C 19/20; F16C 33/3713; F16C 33/62; F16C 2204/00; F16C 2206/82
USPC ........... 384/492, 504, 521; 378/219, 227–230
See application file for complete search history.

(56) References Cited

U.S. PATENT DOCUMENTS

| | | | |
|---|---|---|---|
| 3,036,365 | A | 5/1962 | Hanau |
| 3,579,780 | A | 5/1971 | Matt et al. |
| 3,711,171 | A | 1/1973 | Orkin et al. |
| 3,977,739 | A | 8/1976 | Moskowitz et al. |
| 4,005,914 | A | 2/1977 | Newman |
| 4,060,452 | A | 11/1977 | Acher |
| 4,108,692 | A | 8/1978 | Quinlan |
| 4,795,682 | A | 1/1989 | Turner et al. |

(Continued)

FOREIGN PATENT DOCUMENTS

| | | | |
|---|---|---|---|
| GB | 0891318 | A * | 3/1962 |
| WO | 9636059 | A1 | 11/1996 |

(Continued)

*Primary Examiner* — Phillip A Johnson
(74) *Attorney, Agent, or Firm* — MKG, LLC (57) ABSTRACT

A duplex bearing is configured for use with a nuclear reactor control rod drive mechanism. The duplex includes an outer member and an inner member wherein each defines an interior surface and an exterior surface. The outer member interior surface defines a first and second outer raceway; and the inner member defines a first and second inner raceway. A first plurality of load-carrying rolling elements and a first plurality of spacer rolling elements are disposed in a first annular cavity defined between the first inner raceway and first outer raceway. A second plurality of load-carrying rolling elements and a second plurality of spacer rolling elements are disposed in a second annular cavity defined between the second inner raceway and the second outer raceway. The duplex bearing is configured to operate with sealed de-ionized water exhibiting a temperature in the range of up to about 1200° F. as a sole lubricant.

23 Claims, 5 Drawing Sheets

(56) References Cited

U.S. PATENT DOCUMENTS

| | | |
|---|---|---|
| 4,997,296 A | 3/1991 | Narita et al. |
| 5,161,898 A * | 11/1992 | Drake .................... 384/95 |
| 5,377,552 A * | 1/1995 | Kley .................... 73/862.49 |
| 5,425,064 A | 6/1995 | Termaat et al. |
| 5,755,298 A | 5/1998 | Langford, Jr. et al. |
| 5,961,222 A | 10/1999 | Yabe et al. |
| 6,425,922 B1 | 7/2002 | Pope et al. |
| 6,471,408 B1 * | 10/2002 | Ikeda et al. .................... 384/470 |
| 6,474,424 B1 | 11/2002 | Saxman |
| 6,655,845 B1 | 12/2003 | Pope et al. |
| 6,709,463 B1 | 3/2004 | Pope et al. |
| 6,764,219 B2 | 7/2004 | Doll et al. |
| 6,874,942 B2 | 4/2005 | Yamamoto et al. |
| 7,004,635 B1 | 2/2006 | Smith et al. |
| 7,343,002 B1 | 3/2008 | Lee et al. |
| 7,377,695 B2 * | 5/2008 | Qiu et al. .................... 384/504 |
| 7,461,978 B2 | 12/2008 | Pope et al. |
| 7,543,992 B2 | 6/2009 | Bruce et al. |
| 8,147,981 B2 | 4/2012 | Lang et al. |
| 8,196,682 B2 | 6/2012 | Dick et al. |
| 8,210,751 B2 | 7/2012 | Streit et al. |
| 2002/0067874 A1 * | 6/2002 | Beaman .................... 384/521 |
| 2002/0164100 A1 | 11/2002 | Gieslet et al. |
| 2002/0196991 A1 | 12/2002 | Giesler et al. |
| 2003/0019106 A1 | 1/2003 | Pope et al. |
| 2003/0185478 A1 | 10/2003 | Doll et al. |
| 2004/0223676 A1 | 11/2004 | Pope et al. |
| 2006/0056754 A1 | 3/2006 | Beer et al. |
| 2006/0067478 A1 * | 3/2006 | Canfield .................... 378/141 |
| 2007/0283563 A1 | 12/2007 | Lee et al. |
| 2008/0056450 A1 | 3/2008 | Joshi et al. |
| 2008/0056631 A1 | 3/2008 | Beausoleil et al. |
| 2008/0187262 A1 | 8/2008 | Niebling et al. |
| 2009/0046967 A1 | 2/2009 | Pope et al. |
| 2010/0061676 A1 * | 3/2010 | Sugiyama et al. ............. 384/625 |
| 2010/0183475 A1 | 7/2010 | Radon et al. |
| 2011/0071061 A1 | 3/2011 | Lang et al. |
| 2011/0316376 A1 | 12/2011 | Sortore et al. |
| 2012/0080123 A1 | 4/2012 | Padula, II et al. |

FOREIGN PATENT DOCUMENTS

| | | |
|---|---|---|
| WO | 9949174 A1 | 9/1999 |
| WO | 2004001238 A2 | 12/2003 |
| WO | 2006116977 A1 | 11/2006 |

* cited by examiner

INTEGRATED CARTRIDGE DOUBLE-ROW BALL BEARING FOR A NUCLEAR REACTOR CONTROL ROD DRIVE MECHANISM

TECHNICAL FIELD

The present invention is directed to bearings and, more particularly, to a duplex bearing arrangement configured for use with a control rod drive mechanism in a nuclear reactor. More particularly, the present invention is directed to an integrated cartridge double-row ball bearing with a cage-less design that includes a one-piece outer ring and a one-piece inner ring.

BACKGROUND

A commercial nuclear reactor produces heat from which electricity is generated. The heat is produced by of fission of a nuclear fuel, referred to as a nuclide, such as enriched uranium. A control rod is used in a nuclear reactor to control the rate of fission of the nuclear fuel. Controlling a nuclear reaction is a matter of ensuring that the control rods are precisely positioned at the right time. The control rod is removed from or inserted into the central core of the nuclear reactor to control a neutron flux by increasing or decreasing the rate of fission of the nuclear fuel. Typically, one or more control rods are positioned vertically within the central core. A control rod drive mechanism ("CRDM") is designed to insert, withdraw or maintain the position of the control rod. Typically, the CRDM is contained within a pressure housing that comprises a tubular extension of the reactor pressure vessel.

The CDRM typically is supported within the tubular pressure housing by a pair of angular contact ball bearings configured for use as a matched set. In general, each angular contact ball bearing includes an inner ring, an outer ring, and a plurality of rolling elements disposed between the inner ring and the outer ring. In many applications, the plurality of rolling elements is separated by a plurality of spacers wherein typically a spacer is positioned between a pair of rolling elements. Such a pair of angular contact ball bearings is commonly referred to as a "duplexed" pair of bearings and shall be referred to herein generally as a "duplex bearing." The CDRM typically is supported by more than one pair of angular contact ball bearings, that is, more than one duplex bearing. The duplex bearings provide for precise location of a shaft positioned at least partially therein and are designed to meet operating parameters of a nuclear reactor.

Standard duplex bearings are fabricated by mounting or otherwise joining the pair of angular contact ball bearings to one another. There are three basic mounting methods to accommodate different loading requirements: Back-to-Back (referred to herein as a "B-Type" duplex bearing), Face-to-Face (referred to herein as an "F-Type" duplex bearing), and Tandem (referred to herein as a "T-Type" duplex bearing). Generally, B-Type and F-Type duplex bearings accommodate heavy radial loads, combined radial and thrust loads, reversing thrust loads and moment loads; while T-Type duplex bearings accommodate heavy radial loads and high one-direction thrust loads with minimum axial shaft deflection. Standard duplex bearings are fabricated such that there is a light axial pre-load induced on the bearing at nominal conditions. In some applications, increased bearing stiffness is provided by inducing a heavier axial load in the mounted bearing. Moreover, the axial load can be increased or decreased to meet the requirements of a particular application.

Typically, angular contact ball bearings include an outer ring having a generally cylindrical exterior surface and a generally cylindrical interior surface, and an inner ring having a generally cylindrical exterior surface and a generally cylindrical interior surface. The inner ring is disposed within the outer ring. A plurality of rolling elements such as balls is disposed in a cavity between the inner ring exterior surface and the outer ring interior surface such that the inner ring is rotatable with respect to the outer ring. In some rolling bearings, the plurality of rolling elements is disposed in a circular frame or cage which holds the rolling elements in place in the rolling bearing.

SUMMARY

In one aspect, the present invention resides in a duplex bearing configured for use with a nuclear reactor control rod drive mechanism. The duplex bearing comprises: an outer member having an outer member interior surface and an outer member exterior surface, the outer member interior surface defining a first outer raceway and a second outer raceway; an inner member having an inner member interior surface and an inner member exterior surface, the inner member exterior surface defining a first inner raceway and a second inner raceway; a first plurality of load-carrying rolling elements disposed in a first annular cavity defined between the first inner raceway and the first outer raceway; a first plurality of spacer rolling elements disposed in the first annular cavity such that adjacent load-carrying rolling elements of the first plurality of load-carrying rolling elements are separated by one of the first plurality of spacer rolling elements; a second plurality of load-carrying rolling elements disposed in a second annular cavity defined between the second inner raceway and the second outer raceway; and a second plurality of spacer rolling elements disposed in the second annular cavity such that adjacent load-carrying rolling elements of the second plurality of load-carrying rolling elements are separated by one of the second plurality of spacer rolling elements.

DESCRIPTION OF THE INVENTION

Figure 1:
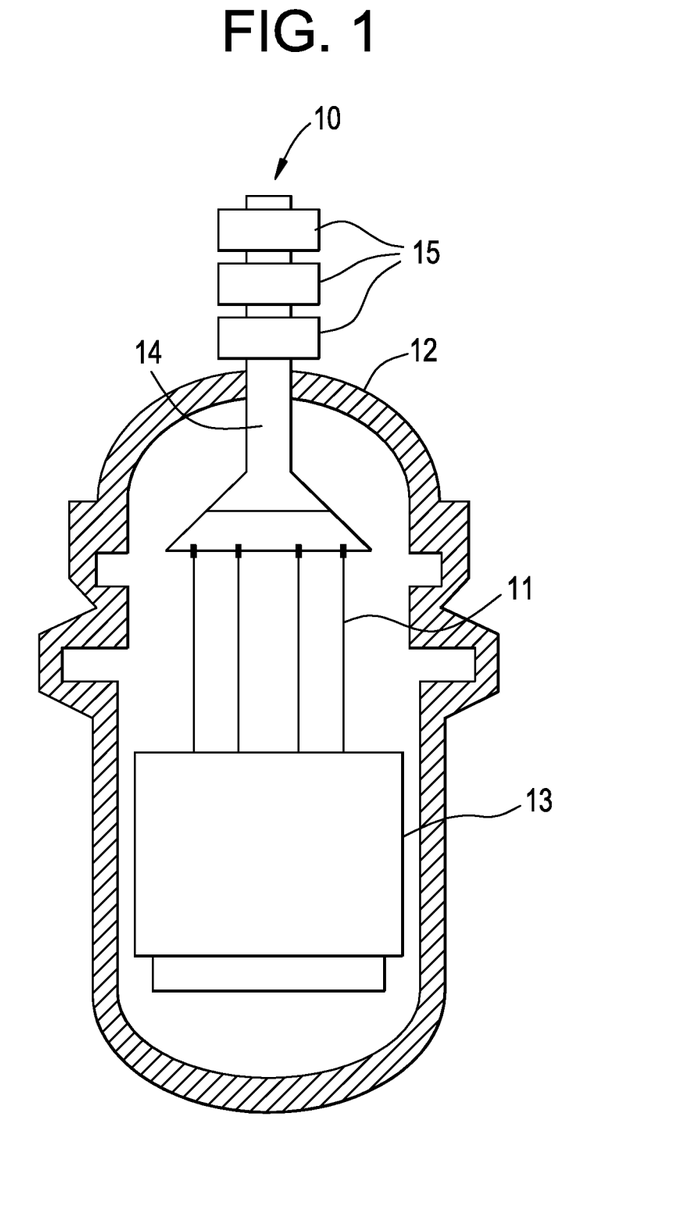
FIG. 1 provides a schematic illustration of one embodiment of a CRDM in accordance with the present invention.

As shown in FIG. 1, a CRDM 10 is designed to insert, withdraw or maintain the position of a set of control rods 11 in a central core 13 of a nuclear reactor contained within a reactor pressure vessel housing 12. A control rod drive shaft 14 extends through a set of magnetic coils 15 configured to operably engage drive shaft 14. A rate of power that is fed to the magnetic coils 15 retains drive shaft 14 in a first position, and increasing or decreasing the rate of power causes drive shaft 14 to move the control rods 11 incrementally up or down and, in turn, increase or decrease the rate of fission of a nuclear fuel. Typically, drive shaft 14 extends between at least two rolling bearings to facilitate vertical movement thereof.

Figure 2A:
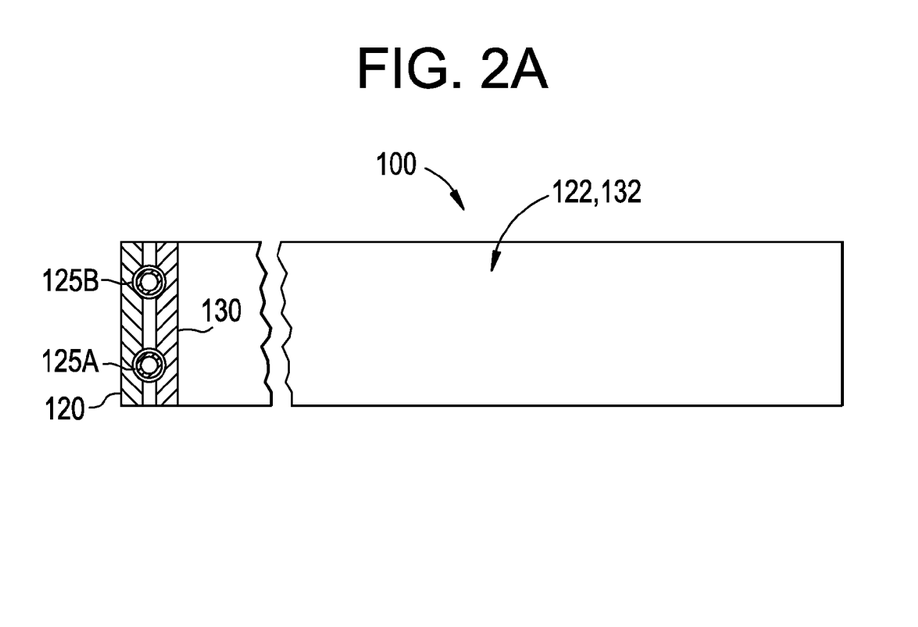
FIG. 2A provides a cross-sectional view of one embodiment of a duplex bearing in accordance with the present invention.
Figure 2B:
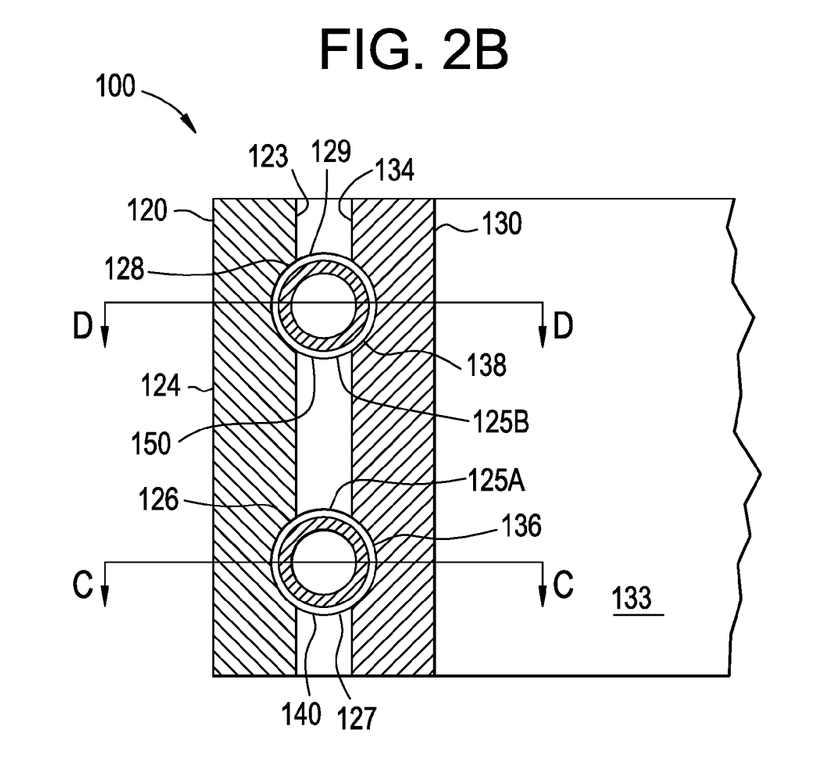
FIG. 2B provides an enlarged cross-sectional view of the duplex bearing shown in FIG. 2A.

One embodiment of a duplex bearing assembly of the present invention is shown in FIGS. 2A and 2B designated generally by the reference number 100 and is hereinafter referred to as "duplex bearing 100." Duplex bearing 100 is a "full cartridge" duplex bearing comprising a one-piece outer member or ring 120, a one-piece inner member or ring 130, and a duplex pair of a first plurality of rolling elements 125A and a second plurality of rolling elements 125B disposed between the outer ring 120 and the inner ring 130. Such a design provides for pre-assembly of duplex bearing 100 which provides for simple installation in the field. The outer ring 120 and the inner ring 130 are both generally annular and share a common central axis (not shown). The inner ring 130 defines a bore or a central aperture 132 for receiving a shaft or like member therein, such as for example control rod drive shaft 14 (FIG. 1).

As further shown in FIGS. 2A-2D, the inner ring 130 is coaxially disposed at least partially within the outer ring 120. The inner ring 130 has an interior surface 133 and an exterior surface 134. The inner ring exterior surface 134 defines a first inner raceway 136 and a second inner raceway 138. The outer ring 120 has an annular configuration and defines a bore or a central aperture 122 for receiving the inner ring 130. The outer ring 120 has an interior surface 123 and an exterior surface 124. The outer ring interior surface 123 defines a first outer raceway 126 and a second outer raceway 128. A first annular cavity 127 is defined between the first inner raceway 136 and the first outer raceway 126; and a second annular cavity 129 is defined between the second inner raceway 138 and the second outer raceway 128.

Figure 2C:
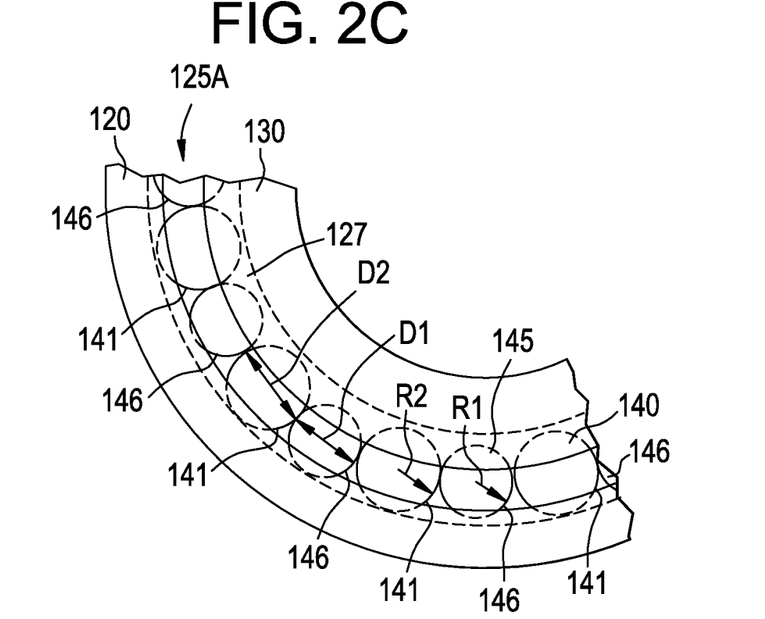
FIG. 2C provides a sectional view of a portion of the duplex bearing shown in FIG. 2A taken along line C-C of FIG. 2B.
Figure 2D:
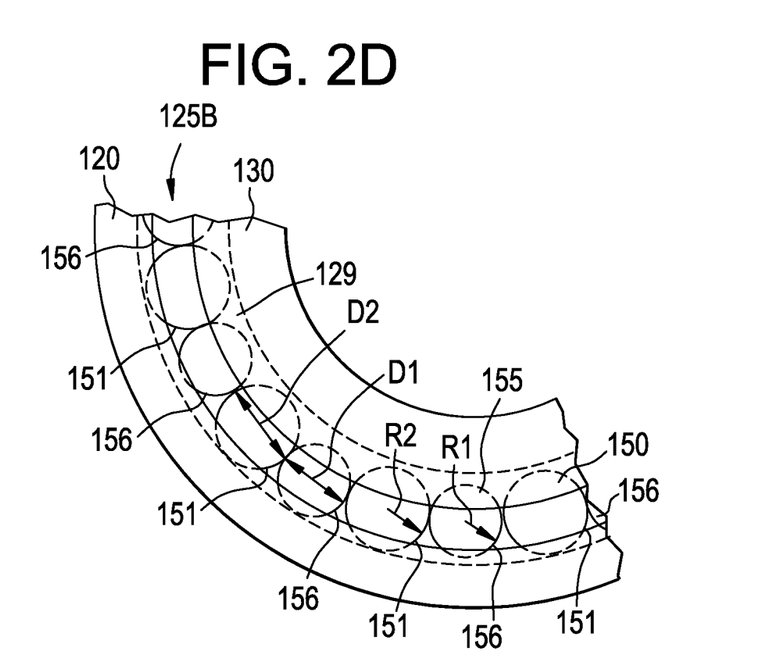
FIG. 2D provides a sectional view of another portion of the duplex bearing shown in FIG. 2A taken along line D-D of FIG. 2B.

As shown in FIGS. 2C and 2D, the duplex pair of the first and second plurality of rolling elements 125A and 125B respectively includes a first plurality of load-carrying rolling elements 140 disposed in the first annular cavity 127 defined between the first inner raceway 136 and the first outer raceway 126; and a second plurality of load-carrying rolling elements 150 disposed in the second annular cavity 129 between the second inner raceway 138 and the second outer raceway 128. As further shown in FIG. 2C, the duplex pair of rolling elements 125A further includes a first plurality of spacer rolling elements 145 disposed in the first annular cavity 127 such that adjacent load-carrying rolling elements of the first plurality of load-carrying rolling elements 140 are separated by one of the first plurality of spacer rolling elements 145. As further shown in FIG. 2D, the duplex pair of rolling elements 125B further includes a second plurality of spacer rolling elements 155 disposed in the second annular cavity 129 such that adjacent load-carrying rolling elements of the second plurality of load-carrying rolling elements 150 are separated by one of the second plurality of spacer rolling elements 155. Accordingly, duplex bearing 100 comprises a cage-less design thereby eliminating any possibility of cage failure.

As further shown in FIGS. 2C and 2D, the first plurality of load-carrying rolling elements 140 comprises a first plurality of load balls 141, and the second plurality of load-carrying rolling elements 150 comprises a second plurality of load balls 151. The first plurality of spacer rolling elements 145 comprises a first plurality of spacer balls 146, and the second plurality of spacer rolling elements 155 comprises a second plurality of spacer balls 156. In the illustrated embodiment, the first and second plurality of load balls 141 and 151 are respectively separated by the first and second plurality of spacer balls 146 and 156. In one embodiment, the first and second plurality of load-carrying rolling elements 140 and 150, or load balls 141 and 151, are internally preloaded. Preferably, the spacer balls 146 and 156 comprise a slightly smaller outer diameter than an outer diameter of the load balls 141 and 151. In addition, the spacer balls 146 and 156 are designed and configured to be simple, reliable, cost-effective, and eliminate the need for machined cages. As further shown in FIGS. 2C and 2D, the spacer balls 146, 156 have an outside diameter D1 that is about 97 to about 99 percent of a diameter D2 of the load bearing balls 141, 151.

The one-piece outer ring 120 and one-piece inner ring 130 having the duplex pair of rolling elements 125A and 125B disposed therebetween provide improved stiffness of the duplex bearing 100 and reduced distortion, and improved runout and parallelism. As a result, duplex bearing 100 provides superior accuracy and performance reliability, including improved alignment and ease of next level assemblies. The one-piece outer ring 120 and one-piece inner ring 130 ring configurations also allows for unique manufacturing processes to be implemented which are not possible for fabricating a simple duplex bearing comprising a pair of angular contact bearings. For example, the one-piece outer ring 120 and one-piece inner ring 130 configuration are concurrently fabricated by precision machining both rings or raceways in the same operation. Optionally, one or more shields (not shown) may be machined integral to the outer ring 120 extending radially inwardly toward the inner ring 130 to provide shielding for the duplex pair of rolling elements 125A and 125B.

The one-piece outer ring 120 and one-piece inner ring 130, the first and second plurality of load-carrying rolling elements 140 and 150, and the first and second plurality of spacer rolling elements 145 and 155, all are made from a material suitable for reliable operation in a sealed de-ionized water environment having a temperature in the range of up to about 1200° F. without another form of active lubrication. Such a suitable material includes metals and metal alloys, and more particularly superalloys. One such suitable superalloy from which the first and second plurality of load-carrying rolling elements 140 and 150 may be fabricated is a cobalt alloy, such as for example cobalt alloy #3. The one-piece outer ring 120 and one-piece inner ring 130 also may be fabricated from a cobalt alloy, such as for example cobalt alloy #19. The first and second plurality of spacer rolling elements 145 and 155 may be fabricated from a cobalt alloy, such as for example cobalt alloy #3, or from a carbide alloy, such as for example tungsten carbide which will impart some improvement in bearing rolling friction and lubrication. In one embodiment, duplex bearing 100 is configured to operate with the elevated-temperature sealed de-ionized water as a sole lubricant.

One or more duplex bearing assemblies 100 support the CRDM 10 in the central core, or hot section, of the nuclear reactor, and are designed and configured to operate reliably in the sealed environment comprising de-ionized water having a temperature in the range of up to about 1200 F and without any other form of active lubrication. For all intent and purposes, there are no viable options to provide alternate forms of active lubrication except for the limited and marginal lubricating properties of the elevated-temperature de-ionized water. The duplex bearing assemblies 100 are designed and configured to operate in such an environment for over sixty (60) years which represents an over 100% improvement in the life of conventional bearings currently in use with such control rod drive mechanisms.

Figure 3:
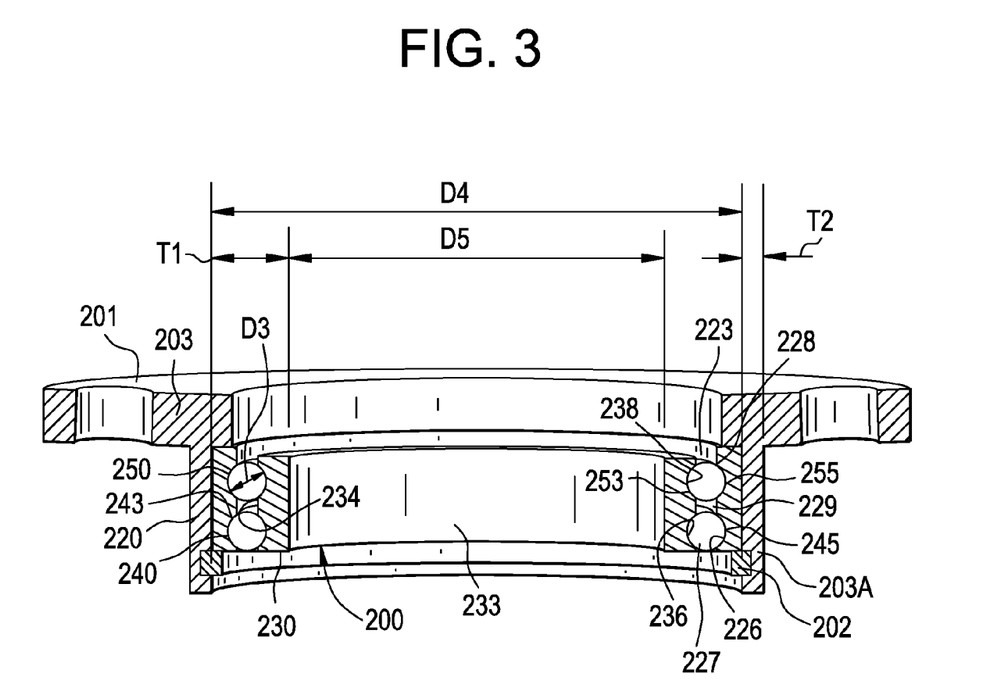
FIG. 3 provides a cross-sectional view of one embodiment of a duplex bearing mounted in a bearing mounting flange of a CRDM in accordance with the present invention.

Another embodiment of duplex bearing assembly of the present invention is shown in FIG. 3 designated generally by the reference number 200 and is hereinafter referred to as "duplex bearing 200." The duplex bearing 200 depicted in FIG. 3 is similar to the duplex bearing 100 shown in FIGS. 2A-2D; thus, like elements are given a like element number preceded by the numeral 2.

As shown in FIG. 3, duplex bearing 200 is mounted in a bearing mounting flange 201 of a CRDM in accordance with the present invention. Duplex bearing 200 includes a one-piece outer ring 220 and a one-piece inner ring 230 disposed within the outer ring 220. The inner ring 230 has an interior surface 233 and an exterior surface 234. The inner ring exterior surface 234 defines a first inner raceway 236 and a second inner raceway 238. The outer ring 220 has an interior surface 223 and an exterior surface (not shown). The outer ring interior surface 223 defines a first outer raceway 226 and a second outer raceway 228. A first annular cavity 227 is defined between the first inner raceway 236 and the first outer raceway 226; and a second annular cavity 229 is defined between the second inner raceway 238 and the second outer raceway 228.

A first plurality of load-carrying rolling elements 240 is disposed in the first annular cavity 227 defined between the first inner raceway 236 and the first outer raceway 226; and a second plurality of load-carrying rolling elements 250 is disposed in the second annular cavity 229 between the second inner raceway 238 and the second outer raceway 228. A first plurality of spacer rolling elements 245 is disposed in the first annular cavity 227 such that adjacent load-carrying rolling elements of the first plurality of load-carrying rolling elements 240 are separated by one of the first plurality of spacer rolling elements 245. A second plurality of spacer rolling elements 255 is disposed in the second annular cavity 229 such that adjacent load-carrying rolling elements of the second plurality of load-carrying rolling elements 250 are separated by one of the second plurality of spacer rolling elements 255. Accordingly, duplex bearing 200 comprises a cage-less (i.e., no cage) design thereby eliminating any possibility of cage failure.

In one embodiment, the first and second plurality of load-carrying rolling elements 240 and 250 each comprise a plurality of load balls 243; and the first and second plurality of spacer rolling elements 245 and 255 each comprise a plurality of spacer balls 253. In one embodiment, duplex bearing 200 comprises a duplex pair (i.e., two rows) of sixteen (16) load balls 243 wherein such load balls 243 are respectively separated by sixteen (16) spacer balls 253. In one embodiment, the load balls 243 define an outer diameter "D3" in the range of about 0.25 inch. In one embodiment, the spacer balls 253 define an outside diameter that is about 97 to about 99 percent of D3. In one embodiment, the outer ring 220 defines an outer diameter "D4" in the range of about three inches. In one embodiment, the inner ring 230 defines an inner diameter "D5" in the range of about two inches. In an embodiment wherein D4 is about three inches and D5 is about two inches, a thickness "T1" of duplex bearing 200, defined as half of the difference between D4 and D5 (i.e., (D4-D5)/2)), is about 0.5 inch. In one embodiment, D3 is 0.25 inch, D4 is 3.031 inches, D5 is 2.165 inches, and accordingly T1 is about 0.94 inch.

In one embodiment, bearing mounting flange 201 comprises a retainer portion 203 that in turn defines a retainer leg 203A for receiving and engaging the outer ring 220 and the retainer leg 203A comprises a thickness "T2." In one embodiment, T2 is in the range of about 0.125 inch. In one embodiment, T2 is 0.112 inch. In one embodiment, a snap ring 202 is installed in the bearing mounting flange 201 to retain the duplex bearing 200 in retainer 203. The load balls 243 are preloaded as described above with reference to duplex bearing 100, and the snap ring 202 is contained in the retainer 203 and is not exposed to a thrust load.

Figure 4:
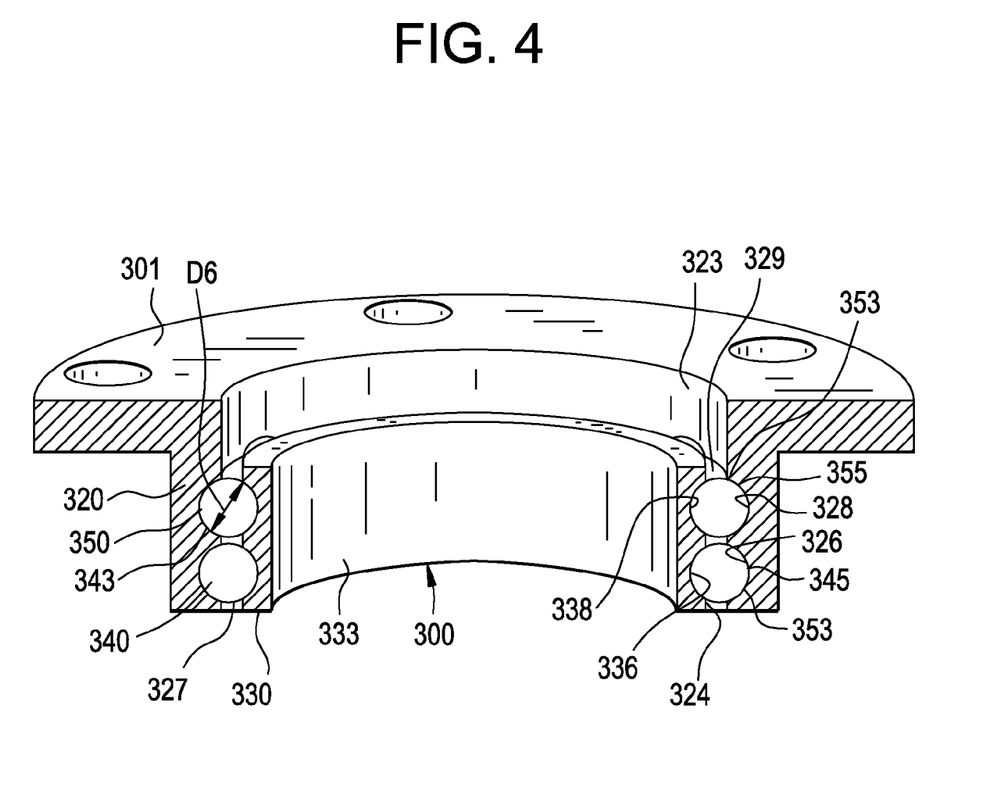
FIG. 4 provides a cross-sectional view of another embodiment of a duplex bearing mounted in a bearing mounting flange of a CRDM in accordance with the present invention.

Another embodiment of duplex bearing assembly of the present invention is shown in FIG. 4 designated generally by the reference number 300 and is hereinafter referred to as "duplex bearing 300." The duplex bearing 300 depicted in FIG. 4 is similar to the duplex bearing 100 shown in FIGS. 2A-2D; thus, like elements are given a like element number preceded by the numeral 3.

As shown in FIG. 4, duplex bearing 300 is mounted in a bearing mounting flange 301 of a CRDM in accordance with the present invention. Duplex bearing 300 includes a one-piece outer ring 320 and a one-piece inner ring 330 disposed within the outer ring 320. In the embodiment illustrated in FIG. 4, the one-piece outer ring 320 is integrally formed with, or is an extension of, the bearing mounting flange 301. The inner ring 330 has an interior surface 333 and an exterior surface 324. The inner ring exterior surface 324 defines a first inner raceway 336 and a second inner raceway 338. The outer ring 320 has an interior surface 323 and an exterior surface (not shown). The outer ring interior surface 323 defines a first outer raceway 326 and a second outer raceway 328. A first annular cavity 327 is defined between the first inner raceway 336 and the first outer raceway 326; and a second annular cavity 329 is defined between the second inner raceway 338 and the second outer raceway 328.

A first plurality of load-carrying rolling elements 340 is disposed in the first annular cavity 327 defined between the first inner raceway 336 and the first outer raceway 326; and a second plurality of load-carrying rolling elements 350 is disposed in the second annular cavity 329 between the second inner raceway 338 and the second outer raceway 328. A first plurality of spacer rolling elements 345 is disposed in the first annular cavity 327 such that adjacent load-carrying rolling elements of the first plurality of load-carrying rolling elements 340 are separated by one of the first plurality of spacer rolling elements 345. A second plurality of spacer rolling elements 355 is disposed in the second annular cavity 329 such that adjacent load-carrying rolling elements of the second plurality of load-carrying rolling elements 350 are separated by one of the second plurality of spacer rolling elements 355. Accordingly, duplex bearing 300 comprises a cage-less design thereby eliminating any possibility of cage failure.

In one embodiment, the first and second plurality of load-carrying rolling elements 340 and 350 each comprise a plurality of load balls 343; and the first and second plurality of spacer rolling elements 345 and 355 each comprise a plurality of spacer balls 353. In one embodiment, duplex bearing 300 comprises a duplex pair (i.e., two rows) of fourteen (14) load balls 343 wherein such load balls 343 are respectively separated by fourteen (14) spacer balls 353. In one embodiment, the load balls 343 define an outer diameter "D6" in the range of about 0.375 inch. In one embodiment, D6 is 0.3125 inch. In one embodiment, the spacer balls 353 define an outside diameter that is about 97 to about 99 percent of D6.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A duplex bearing configured for use with a nuclear reactor control rod drive mechanism,
the duplex bearing comprising:
an outer member having an outer member interior surface and an outer member exterior surface, the outer member interior surface defining a first outer raceway and a second outer raceway;
an inner member having an inner member interior surface and an inner member exterior surface, the inner member exterior surface defining a first inner raceway and a second inner raceway;
a first plurality of load-carrying rolling elements disposed in a first annular cavity defined between the first inner raceway and the first outer raceway;
a first plurality of spacer rolling elements disposed in the first annular cavity such that adjacent load-carrying rolling elements of the first plurality of load-carrying rolling elements are separated by one of the first plurality of spacer rolling elements;
a second plurality of load-carrying rolling elements disposed in a second annular cavity defined between the second inner raceway and the second outer raceway; and
a second plurality of spacer rolling elements disposed in the second annular cavity such that adjacent load-carrying rolling elements of the second plurality of load-carrying rolling elements are separated by one of the second plurality of spacer rolling elements;
said duplex bearing being configured to withstand temperatures of up to 1200° F. in deionized water in a nuclear reactor core.

2. The duplex bearing of claim 1 wherein the outer member and the inner member each define an annular configuration and the inner member is coaxially disposed at least partially within the outer member.

3. The duplex bearing of claim 1 wherein the inner member and the outer member are fabricated from a superalloy.

4. The duplex bearing of claim 1 wherein the inner member and the outer member are fabricated from a cobalt alloy.

5. The duplex bearing of claim 1 wherein the inner member and the outer member are fabricated from cobalt alloy #19.

6. The duplex bearing of claim 1 wherein the first and second plurality of load-carrying rolling elements are fabricated from a superalloy.

7. The duplex bearing of claim 1 wherein the first and second plurality of load-carrying rolling elements are fabricated from a cobalt alloy.

8. The duplex bearing of claim 1 wherein the first and second plurality of load-carrying rolling elements are fabricated from cobalt alloy #3.

9. The duplex bearing of claim 1 wherein the first and second plurality of spacer rolling elements are fabricated from a superalloy.

10. The duplex bearing of claim 1 wherein the first and second plurality of spacer rolling elements are fabricated from a cobalt alloy.

11. The duplex bearing of claim 1 wherein the first and second plurality of spacer rolling elements are fabricated from cobalt alloy #3.

12. The duplex bearing of claim 1 wherein the first and second plurality of spacer rolling elements are fabricated from a carbide alloy.

13. The duplex bearing of claim 1 wherein the first and second plurality of spacer rolling elements are fabricated from tungsten carbide.

14. The duplex bearing of claim 1 configured to operate with sealed de-ionized water as a sole lubricant.

15. The duplex bearing of claim 14 wherein the sealed de-ionized water exhibits a temperature in the range of up to about 1200° F.

16. The duplex bearing of claim 1 wherein the first and second plurality of load-carrying rolling elements are internally preloaded against each other.

17. The duplex bearing of claim 1 wherein the first and second plurality of load-carrying rolling elements each comprise sixteen (16) load balls, and the first and second plurality of spacer rolling elements each comprise sixteen (16) spacer balls.

18. The duplex bearing of claim 17 wherein the sixteen (16) load balls each comprise an outer diameter of about 0.25 inch.

19. The duplex bearing of claim 17 wherein the sixteen (16) spacer balls each comprise an outer diameter of about 97 to about 99 percent of the outer diameter of the load balls.

20. The duplex bearing of claim 1 wherein the first and second plurality of load-carrying rolling elements each comprise fourteen (14) load balls, and the first and second plurality of spacer rolling elements each comprise fourteen (14) spacer balls.

21. The duplex bearing of claim 20 wherein the fourteen (14) load balls each comprise an outer diameter of about 0.375 inch.

22. The duplex bearing of claim 20 wherein the fourteen (14) spacer balls each comprise an outer diameter of about 97 to about 99 percent of the outer diameter of the load balls.

23. The duplex bearing of claim 20 wherein the fourteen (14) load balls each comprise an outer diameter of 0.3125 inch.

* * * * *